(12) United States Patent
Lainema et al.

(10) Patent No.: US 8,630,340 B2
(45) Date of Patent: Jan. 14, 2014

(54) METHOD FOR ENCODING AND DECODING VIDEO INFORMATION, A MOTION COMPENSATED VIDEO ENCODER AND A CORRESPONDING DECODER (75) Inventors: Jani Lainema, Irving, TX (US); Marta Karczewicz, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 1573 days.

(21) Appl. No.: 10/762,736

(22) Filed: Jan. 21, 2004

(65) Prior Publication Data

US 2004/0151245 A1    Aug. 5, 2004

Related U.S. Application Data

(63) Continuation of application No. 09/489,543, filed on Jan. 21, 2000, now Pat. No. 6,738,423.

(51) Int. Cl.
    *H04N 7/12* (2006.01)
(52) U.S. Cl.
    USPC ............. 375/240.03; 375/240.01; 375/240.25
(58) Field of Classification Search
    USPC .................. 375/240, 240.01, 240.02, 240.03,
              375/240.12, 240.13, 240.16, 240.22, 240.25
    See application file for complete search history.

(56) References Cited

U.S. PATENT DOCUMENTS

| | | | |
|---|---|---|---|
| 5,025,482 A | 6/1991 | Murakami et al. | 382/56 |
| 5,111,294 A | 5/1992 | Asai et al. | 358/136 |
| 5,396,292 A | 3/1995 | Murata | 348/409 |
| 5,428,396 A * | 6/1995 | Yagasaki et al. | 375/240.16 |
| 5,565,921 A | 10/1996 | Sasaki et al. | 348/409 |
| 5,731,837 A | 3/1998 | Hurst, Jr. | 348/405 |
| 5,778,192 A | 7/1998 | Schuster et al. | |
| 5,923,376 A | 7/1999 | Pullen et al. | 348/417 |
| 6,249,546 B1 * | 6/2001 | Bist | 375/240.03 |
| 6,256,347 B1 * | 7/2001 | Yu et al. | 375/240.13 |
| 6,266,375 B1 | 7/2001 | Chang et al. | 375/240.3 |

(Continued)

FOREIGN PATENT DOCUMENTS

| | | |
|---|---|---|
| WO | WO 96/38006 | 11/1996 |
| WO | WO 97/17797 | 5/1997 |
| WO | WO 9716025 A1 * | 5/1997 |
| WO | WO 97/40628 | 10/1997 |

OTHER PUBLICATIONS

Nokia Research Center et al., "Proposal for Advanced Video Coding" 16.LBC Meeting Feb. 25-28, 1997; NICE; (ITU Low Bitrate Coding Group), No. LBC-97-029, Feb. 25, 1997.

(Continued)

*Primary Examiner* — Allen Wong
(74) *Attorney, Agent, or Firm* — Alston & Bird LLP (57) ABSTRACT

A motion compensated video coding method which can be applied especially in transfer of video streams using low transmission bit rate is presented. In the motion compensated coding method, the motion of picture elements between a piece of reference video information and a piece of current video information is estimated and then modeled using certain basis function and coefficients. The coefficients are quantized, and the quantizer is selected according to a certain selection criterion, for example, based on a target image quality or on a target transmission bit rate. Preferably the selection criterion is such that it automatically adjust the accuracy with which the motion of picture elements is represented to be related to the accuracy with which the prediction error information is represented. A decoding method, an encoder and a corresponding decoder are also described.

9 Claims, 7 Drawing Sheets

(56) References Cited

U.S. PATENT DOCUMENTS

| | | | |
|---|---|---|---|
| 6,343,098 B1 | 1/2002 | Boyce | 375/240.03 |
| 6,366,614 B1 | 4/2002 | Pian et al. | 375/240.02 |
| 6,430,222 B1 | 8/2002 | Okada | 375/240.03 |
| 6,438,167 B1 | 8/2002 | Shimizu et al. | 375/240.03 |
| 6,735,249 B1 | 5/2004 | Karczewicz et al. | |

OTHER PUBLICATIONS

Bi, H. et al., "Motion-Compensated Transform Coding of Video Using Adaptive Displacement Fields", Journal of Electronic Imaging, SPIE / IS & T, vol. 7, No. 3, Jul. 1, 1998.

Jiadong, Shen et al., "More experiments and lower-complexity implementation of Adaptive Motion Accuracy", Video Standards and Drafts, No. q15i38, Oct. 14, 1999.

European Search Report, European Application No. 08159674.4-2223, mailed Oct. 21, 2008.

Marcotegui, B.; "*Segmentation Algorithm by Multicriteria Region Merging*;" Mathematical Morphology and its Application to Image and Signal Processing Computational Imaging and Vision, vol. 5, pp. 313-320; dated 1996; abstract retrieved on Aug. 27, 2013 from <http://link.springer.com/chapter/10.1007%2F978-1-4613-0469-2_36>.

Nguyen, H., et al.; "*Representation of motion information for image coding*;" Proceedings of the Picture Coding Symposium '90; pp. 841-845; dated Mar. 18-26, 1990.

\* cited by examiner

METHOD FOR ENCODING AND DECODING VIDEO INFORMATION, A MOTION COMPENSATED VIDEO ENCODER AND A CORRESPONDING DECODER

CROSS-REFERENCE TO RELATED APPLICATIONS

This application is a continuation of U.S. patent application Ser. No. 09/489,543, filed on Jan. 21, 2000, now U.S. Pat. No. 6,738,423, issued May 18, 2004.

The present invention relates to video coding. In particular, it relates to compression of video information using motion compensated prediction.

BACKGROUND OF THE INVENTION

A video sequence consists of a large number video frames, which are formed of a large number of pixels each of which is represented by a set of digital bits. Because of the large number of pixels in a video frame and the large number of video frames even in a typical video sequence, the amount of data required to represent the video sequence quickly becomes large. For instance, a video frame may include an array of 640 by 480 pixels, each pixel having an RGB (red, green, blue) color representation of eight bits per color component, totaling 7,372,800 bits per frame. Video sequences comprise a sequence of still images, which are recorded/displayed at a rate of typically 15-30 frames per second. The amount of data needed to transmit information about each pixel in each frame separately would thus be enormous.

Video coding tackles the problem of reducing the amount of information that needs to be transmitted in order to present the video sequence with an acceptable image quality. For example, in videotelephony the encoded video information is transmitted using conventional telephone networks, where transmission bit rates are typically multiples of 64 kilobits/s. In mobile videotelephony, where transmission takes place at least in part over a radio communications link, the available transmission bit rates can be as low as 20 kilobits/s.

In typical video sequences the change of the content of successive frames is to a great extent the result of the motion in the scene. This motion may be due to camera motion or due to motion of the objects present in the scene. Therefore typical video sequences are characterized by significant temporal correlation, which is highest along the trajectory of the motion. Efficient compression of video sequences usually takes advantage of this property of video sequences. Motion compensated prediction is a widely recognized technique for compression of video. It utilizes the fact that in a typical video sequence, image intensity/chrominance value in a particular frame segment can be predicted using image intensity/chrominance values of some other already coded and transmitted frame, given the motion trajectory between these two frames. Occasionally it is advisable to transmit a whole frame, to prevent the deterioration of image quality due to accumulation of errors and to provide additional functionalities, for example, random access to the video sequence).

Figure 1:
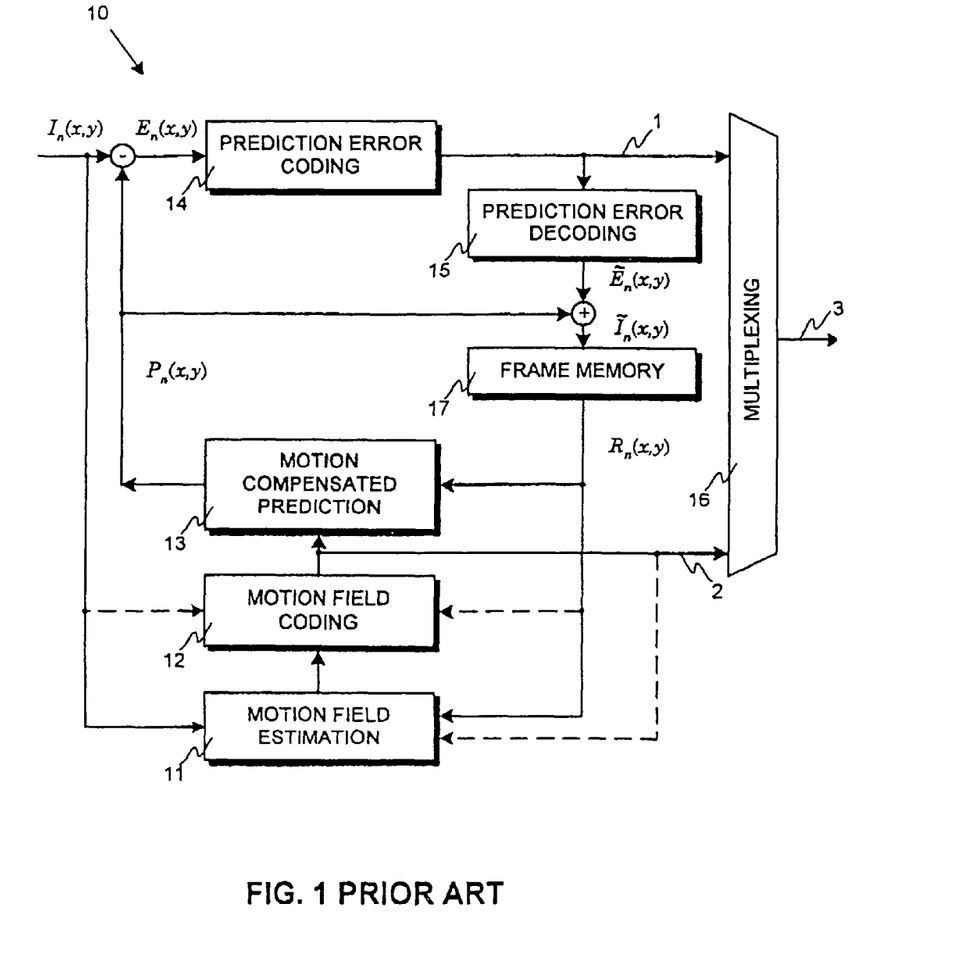
FIG. 1 illustrates an encoder for motion compensated coding of video according to prior art.
Figure 2:
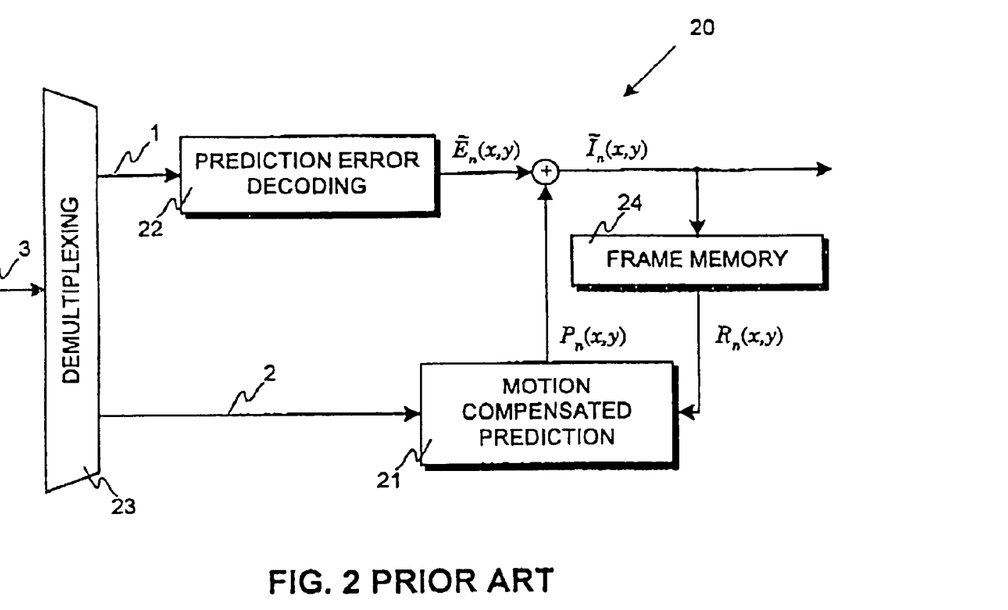
FIG. 2 illustrates a decoder for motion compensated coding of video according to prior art.

A schematic diagram of an example video coding system using motion compensated prediction is shown in FIGS. 1 and 2 of the accompanying drawings. FIG. 1 illustrates an encoder 10 employing motion compensation and FIG. 2 illustrates a corresponding decoder 20. The operating principle of video coders using motion compensation is to minimize the prediction error Same $E_n(x,y)$, which is the difference between the current frame $I_n(x,y)$ being coded and a prediction frame $P_n(x,y)$. The prediction error frame is thus $$E_n(x,y)=I_n(x,y)-P_n(x,y) \qquad (1)$$

The prediction frame is built using pixel values of a reference frame $R_n(x,y)$, which is one of the previously coded and transmitted frames (for example, a frame preceding the current frame), and the motion of pixels between the current frame and the reference frame. The motion of the pixels may be presented as the values of horizontal and vertical displacements $\Delta x(x,y)$ and $\Delta y(x,y)$ of a pixel at location (x,y) in the current frame $I_n(x,y)$. The pair of numbers $[\Delta x(x,y),\Delta y(x,y)]$ is called the motion vector of this pixel. The motion vectors are typically represented using some known functions (called basis functions) and coefficients (this is discussed in more detail below), and an approximate motion vector field $(\tilde{\Delta}x(x,y),\tilde{\Delta}y(x,y))$ can be constructed using the coefficients and the basis functions.

The prediction frame is given by $$P_n(x,y)=R_n[x+\tilde{\Delta}x(x,y),y+\tilde{\Delta}y(x,y)], \qquad (2)$$

where the reference frame $R_n(x,y)$ is available in the Frame Memory 17 of the encoder 10 and in the Frame memory 24 of the decoder 20 at a given instant. An information stream 2 carrying information about the motion vectors is combined with information about the prediction error (1) in the multiplexer 16 and an information stream (3) containing typically at least those two types of information is sent to the decoder 20.

In the Prediction Error Coding block 14, the prediction error frame $E_n(x,y)$ is typically compressed by representing it as a finite series (transform) of some 2-dimensional functions. For example, a 2-dimensional Discrete Cosine Transform (DCT) can be used. The transform coefficients related to each function are quantized and entropy coded before they are transmitted to the decoder (information stream 1 in FIG. 1). Because of the error introduced by quantization, this operation usually produces some degradation in the prediction error frame $E_n(x,y)$.

In the Frame Memory 24 of the decoder 20 there is a previously reconstructed reference frame $R_n(x,y)$. Using the decoded motion information $(\tilde{\Delta}x(x,y),\tilde{\Delta}y(x,y))$ and $R_n(x,y)$ it is possible to reconstruct the prediction frame $P_n(x,y)$ in the Motion Compensated Prediction block 21 of the decoder 20. The transmitted transform coefficients of the prediction error frame $E_n(x,y)$ are used in the Prediction Error Decoding block 22 to construct the decoded prediction error frame $\tilde{E}_n(x,y)$. The pixels of the decoded current frame $\tilde{I}_n(x,y)$ are reconstructed by adding the prediction frame $P_n(x,y)$ and the decoded prediction error frame $\tilde{E}_n(x,y)$ $$\tilde{I}_n(x,y)=P_n(x,y)+\tilde{E}_n(x,y)=R_n[x+\tilde{\Delta}x(x,y),y+\tilde{\Delta}y(x,y)]+\tilde{E}(x,y). \qquad (3)$$

This decoded current frame may be stored in the Frame Memory 24 as the next reference frame $R_{n+1}(x,y)$.

Let us next discuss in more detail the motion compensation and transmission of motion information. The construction of the prediction frame $P_n(x,y)$ in the Motion Compensated Prediction block 13 of the encoder 10 requires information about the motion in the current frame $I_n(x,y)$. Motion vectors $[\Delta x(x,y),\Delta y(x,y)]$ are calculated in the Motion Field Estimation block 11 in the encoder 10. The set of motion vectors of all pixels of the current frame $[\Delta x(\cdot),\Delta y(\cdot)]$ is called the motion vector field. Due to the very large number of pixels in a frame it is not efficient to transmit a separate motion vector for each pixel to the decoder. Instead, in most video coding schemes the current frame is divided into larger image segments and information about the segments is transmitted to the decoder.

The motion vector field is coded in the Motion Field Coding block 12 of the encoder 10. Motion Field Coding refers to representing the motion in a frame using some predetermined functions or, in other words, representing it with a model. Almost all of the motion vector field models commonly used are additive motion models. Motion compensated video coding schemes may define the motion vectors of image segments by the following general formula:

$$\Delta x(x, y) = \sum_{i=0}^{N-1} a_i f_i(x, y) \quad (4)$$

$$\Delta y(x, y) = \sum_{i=0}^{M-1} b_i g_i(x, y) \quad (5)$$

where coefficients $a_i$ and $b_i$ are called motion coefficients. They are transmitted to the decoder. Functions $f_i$ and $g_i$ are called motion field basis functions, and they are known both to the encoder and decoder.

In order to minimize the amount of information needed in sending the motion coefficients to the decoder, coefficients can be predicted from the coefficients of the neighboring segments. When this kind of motion field prediction is used, the motion field is expressed as a sum of a prediction motion field and refinement motion field. The prediction motion field uses the motion vectors associated with neighboring segments of the current frame. The prediction is performed using the same set of rules and possibly some auxiliary information in both encoder and decoder. The refinement motion field is coded, and the motion coefficients related to this refinement motion field are transmitted to the decoder. This approach typically results in savings in transmission bit rate. The dashed lines in FIG. 1 illustrate some examples of the possible information some motion estimation and coding schemes may require in the Motion Field Estimation block 11 and in the Motion Field Coding block 12.

Polynomial motion models are a widely used family of models. (See, for example H. Nguyen and E. Dubois, "Representation of motion information for image coding," in *Proc. Picture Coding Symposium* '90, Cambridge, Mass., Mar. 26-18, 1990, pp. 841-845 and Centre de Morphologie Mathematique (CMM), "Segmentation algorithm by multicriteria region merging," Document SIM(95)19, COST 211ter Project Meeting, May 1995). The values of motion vectors are described by functions which are linear combinations of two dimensional polynomial functions. The translational motion model is the simplest model and requires only two coefficients to describe the motion vectors of each segment. The values of motion vectors are given by the formulae:

$$\Delta x(x,y)=a_0 \, \Delta y(x,y)=b_0 \quad (6)$$

This model is widely used in various international standards (ISO MPEG-1, MPEG-2, MPEG-4, ITU-T Recommendations H.261 and H.263) to describe motion of 16×16 and 8×8 pixel blocks. Systems utilizing a translational motion model typically perform motion estimation at fill pixel resolution or some integer fraction of full pixel resolution, for example with an accuracy of ½ or ⅓ pixel resolution.

Two other widely used models are the affine motion model given by the equation:

$$\Delta x(x,y)=a_0+a_1 x+a_2 y \; \Delta y(x,y)=b_0+b_1 x+b_2 y \quad (7)$$

and the quadratic motion model given by the equation:

$$\Delta x(x,y)=a_0+a_1 x+a_2 y+a_3 xy+a_4 x^2+a_5 y^2 \Delta y(x,y)=b_0+b_1 x+b_2 y+b_3 xy+b_4 x^2+b_5 y^2 \quad (8)$$

The affine motion model presents a very convenient trade-off between the number of motion coefficients and prediction performance. It is capable of representing some of the common real-life motion types such as translation, rotation, zoom and shear with only a few coefficients. The quadratic motion model provides good prediction performance, but it is less popular in coding than the affine model, since it uses more motion coefficients, while the prediction performance is not substantially better. Furthermore, it is computationally more costly to estimate the quadratic motion than to estimate the affine motion.

When the motion field is estimated using higher order motion models (such as presented, for example, in equations 7 and 8), the motion field estimation results in a motion field represented by real numbers. In this case the motion coefficients need to be quantized to a discrete accuracy before they are transmitted to the decoder.

The Motion Field Estimation block 11 calculates motion vectors [$\Delta x(x,y),\Delta y(x,y)$] of the pixels of a given segment $S_k$ which minimize some measure of prediction error in the segment. In the simplest case the motion field estimation uses the current frame $I_n(x,y)$ and the reference frame $R_n(x,y)$ as input values. Typically the Motion Field Estimation block outputs the motion field [$\Delta x(x,y),\Delta y(x,y)$] to the Motion Field Coding block 12. The Motion Field Coding block makes the final decisions on what kind of motion vector field is transmitted to the decoder and how the motion vector field is coded. It can modify the motion model and motion coefficients in order to minimize the amount of information needed to describe a satisfactory motion vector field.

The image quality of transmitted video frames depends on the accuracy with which the prediction frame can be constructed, in other words on the accuracy of the transmitted motion information, and on the accuracy with which the prediction error information is transmitted. Here the term accuracy refers not only to the ability of the emotion field model to represent the motion within the frame but also to the numerical precision with which the motion information and the prediciton error information is represented. Motion information transmitted with hich accuracy may be canceled out in the decoding phase due to low accuracy of the precidiction error frame, or vice versa.

Current video coding systems employ various motion estimation and coding techniques, as discussed above. The accuracy of the motion information and the transmission bit rate needed to transmit the motion information are typically dictated by the choice of the motion estimation and coding technique, and a chosen technique is usually applied to a whole video sequence. Generally, as the accuracy of the transmitted motion information increases, the amount of transmitted information increases.

In general, better image quality requires larger amounts of transmitted information. Typically, if the available transmission bit rate is limited, this limitation dictates the best possible image quality of transmitted video frames. It is also possible to aim for a certain target image quality, and the transmission bit rate then depends on the target image quality. In current video coding and decoding systems, the trade-offs between the required transmission bit rate and image quality are mainly made by adjusting the accuracy of the information presenting the prediction error frame. This accuracy may change, for example, from frame to frame, or even between different segments of a frame.

The problem in changing the accuracy of the transmitted prediction error frame is that it may cause unexpected degradation of the overall performance of the video encoding, for example, when conforming to a new available transmission bit rate. In other words, the image quality achieved is not as good as that expected considering the transmission bit rate.

The image quality may deteriorate drastically, when a lower transmission bit rate is available, or the image quality may not be enhanced even though a higher transmission bit rate is used.

SUMMARY OF THE INVENTION

The object of the invention is to provide a flexible and versatile motion compensated method for encoding/decoding video information. A further object of the invention is to provide a method that ensures good transmitted video quality for various transmission bit rates. A further object is that the method may employ various motion estimation and coding techniques.

These and other objects of the invention are achieved by selecting the quantization accuracy of the motion coefficients so that the accuracy of the transmitted motion information is compatible with the accuracy of the prediction error information.

A method according to the invention is a method for encoding video information, comprising the following steps of:
  estimating the motion of picture elements between a piece of reference video information and a piece of current video information,
  modeling the motion of picture elements using a certain set of basis functions and certain motion coefficients,
  defining a certain set of quantizers,
  selecting, based on a certain predetermined selection criterion, a motion coefficient quantizer from the set of quantizers, and
  quantizing the motion coefficients using the selected motion coefficient quantizer.

In a method according to the invention, the motion of picture elements between a certain piece of reference video information and a piece of current video information is estimated. The resulting motion vector field is represented using certain basis functions and motion coefficients. The basis functions are known both to the encoder and decoder, so the transmission of said coefficients enables the decoder to determine an estimate for the motion of picture elements. Typically the coefficient values are real numbers, and therefore quantization is needed in order to present the coefficients to a certain discrete accuracy using a certain number of bits. The coefficients are quantized before transmission to the decoder, or before using them in constructing a prediction frame.

In a method according to the invention, a set of quantizers is provided. Here the term quantizer refers to a function mapping real numbers to certain reconstruction values. For each reconstruction value there is a quantization interval determining the range of real numbers which are mapped/quantized to said reconstruction value. The size of the quantization intervals can be, for example, the same for each reconstruction value (uniform quantizer) or the size of the quantization interval can be different for each reconstruction value (non-uniform quantizer). The quantization interval determines the accuracy with which the coefficients are represented. The quantizers in the set may all be similar so that the reconstruction values and the quantization intervals are scaled from quantizer to quantizer using a certain parameter. It is also possible that the set of quantizers comprises different types of quantizer, both uniform and non-uniform, for example. Quantizers are further discussed in the detailed description of the invention.

The selection criterion for the quantizer in a method according to the invention can be, for example, the target image quality or the target transmission bit rate. The selection of a quantizer may also be bound to some other variable, which depends on the target image quality or the transmission bit rate. A new quantizer can be selected, for example, each time the target transmission bit rate changes. For various parts of a video frame, for example, it is possible the use different quantizers.

According to the invention, when the target image quality changes, it is possible to adjust the accuracy with which both the prediction error information and the motion information is encoded and transmitted. Therefore, for each image quality or transmission bit rate, it is possible to obtain good overall coding performance. It is possible, for example, to adjust both the accuracy of the prediction error information and that of the motion information to be able to transmit the encoded video stream using a certain bit rate. It is also possible, for example, that the accuracy of the prediction error information is dictated by the target image quality, and in the method according to the invention the accuracy of the motion information is adjusted to be compatible with the prediction error accuracy: quantization should not be too fine, because the motion information cannot enhance image quality beyond the accuracy provided by the prediction error information, but not too coarse either, because coarsely quantized motion information may deteriorate the image quality provided by the prediction error information.

A method according to the invention does not pose any restrictions on the motion field estimation or motion field coding techniques used to obtain the motion coefficients. It is therefore applicable with any such techniques. For example, motion model adaptation may be used to avoid the cost of using an over accurate motion field estimation and coding technique by providing a selection of motion field estimation and/or coding techniques providing various accuracies. An appropriate motion field estimation and/or coding technique can then be selected based on the target image quality or target bit rate, and fine-tuning between the prediction error information accuracy and the motion information accuracy can be performed by selecting a proper quantizer.

The invention can be straightforwardly applied to existing motion compensated video coding methods and systems. In such prior-art systems, the quantization of motion coefficients is typically done to a certain, predetermined accuracy, which works well for a certain target image quality. When the target image quality or the available transmission bit rate differs remarkably from the designed image quality, the video encoder produces worse image quality than that which could be achieved for a given transmission bit rate. This effect can be eliminated by selecting a more appropriate quantizer for the motion coefficients according to the invention.

The invention also relates to a method for decoding encoded video information, comprising the following steps of:
  receiving quantized motion coefficients describing motion of picture elements,
  defining a set of inverse quantizers,
  determining a selected motion coefficient quantizer using which the motion coefficients are quantized,
  performing inverse quantization of the quantized motion coefficients using an inverse quantizer corresponding to the selected motion coefficient quantizer,
  determining the motion of the picture elements using the inverse quantized motion coefficients and certain basis functions, and
  determining a piece of prediction video information using a piece of reference video information and the determined motion of the picture elements.

An encoder according to the invention is an encoder for performing motion compensated encoding of video information, comprising:
  means for receiving a piece of current video information,
  memory means for storing a piece of reference video information,
  motion field estimation means for estimating a motion field of picture elements in the piece of current video information using at least the piece of reference video information,
  motion field coding means, which comprise
    means for producing motion coefficients describing the estimated motion field,
    first selection means for selecting a quantizer from a set of quantizers, said first selection means having an input to receive information indicating a selection criterion and an output to send information indicating the selected quantizer, and
    quantization means for quantizing motion coefficients using the selected quantizer, said quantization means having an input to receive information indicating the selected quantizer, a second input to receive the motion coefficients, and an output to send the quantized motion coefficients, and
  motion compensated prediction means, which means comprise
    second selection means for selecting an inverse quantizer from a set of inverse quantizers, said second selection means having an input to receive information indicating a selection criterion and an output to send information indicating the selected inverse quantizer,
    inverse quantization means for inversely quantizing the quantized motion coefficients using the selected inverse quantizer, said quantization means having an input to receive the quantized motion coefficients, a second input to receive information indicating the selected inverse quantizer and an output to send the inverse quantized motion coefficient, and
    means for determining a a piece of prediction video information using at least the piece of reference video information and the inverse quantized motion coefficients.

The invention relates further to a decoder for performing the decoding of encoded video information, comprising:
  memory means for storing a piece of reference video information,
  input means for receiving quantized motion coefficients, and
  motion compensated prediction means, which comprise
    selection means for selecting an inverse quantizer from a set of inverse quantizers, said second selection means having an input to receive information indicating a selection criterion and an output to send information indicating the selected inverse quantizer,
    inverse quantization means for inversely quantizing the quantized motion coefficients using the selected inverse quantizer, said quantization means having an input to receive the quantized motion coefficients, a second input to receive information indicating the selected inverse quantizer and an output to send the inverse quantized motion coefficient, and
    prediction means for determining a piece of prediction video information using at least the piece of reference video information and the inverse quantized motion coefficients.

In one advantageous embodiment of the invention, the encoder and decoder are combined to form a codec. The motion compensated prediction parts of the encoder and decoder are similar, and they may be provided by a common part, which is arranged to operate as a part of the encoder and a part of the decoder, for example, alternatingly.

The invention relates further to a computer program element for performing motion compensated encoding of video information, comprising:
  means for receiving a piece of current video information,
  memory means for storing a piece of reference video information,
  motion field estimation means for estimating a motion field of picture elements in the piece of current video information using at least the piece of reference video information,
  motion field coding means, which comprise
    means for producing motion coefficients describing the estimated motion field,
    first selection means for selecting a quantizer from a set of quantizers, said first selection means having an input to receive information indicating a selection criterion and an output to send information indicating the selected quantizer, and
    quantization means for quantizing motion coefficients using the selected quantizer, said quantization means having an input to receive information indicating the selected quantizer, a second input to receive the motion coefficients, and an output to send the quantized motion coefficients, and
  motion compensated prediction means, which means comprise
    second selection means for selecting an inverse quantizer from a set of inverse quantizers, said second selection means having an input to receive information indicating a selection criterion and an output to send information indicating the selected inverse quantizer,
    inverse quantization means for inversely quantizing the quantized motion coefficients using the selected inverse quantizer, said quantization means having an input to receive the quantized motion coefficients, a second input to receive information indicating the selected inverse quantizer and an output to send the inverse quantized motion coefficient, and
    means for determining a piece of prediction video information using at least the piece of reference video information and the inverse quantized motion coefficients.

A second computer program element according to the invention is a computer program element for performing the decoding of encoded video information, comprising:
  memory means for storing a piece of reference video information,
  input means for receiving quantized motion coefficients, and
  motion compensated prediction means, which comprise
    selection means for selecting an inverse quantizer from a set of inverse quantizers, said second selection means having an input to receive information indicating a selection criterion and an output to send information indicating the selected inverse quantizer,
    inverse quantization means for inversely quantizing the quantized motion coefficients using the selected inverse quantizer, said quantization means having an input to receive the quantized motion coefficients, a second input to receive information indicating the selected inverse quantizer and an output to send the inverse quantized motion coefficient, and prediction means for determining a piece of prediction video information using at least the piece of reference video information and the inverse quantized motion coefficients.

According to one advantageous embodiment of the invention, a computer program element as specified above is embodied on a computer readable medium.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION

FIGS. 1 and 2 are discussed in detail in the description of motion compensated video encoding and decoding according to prior art.

Figure 3:
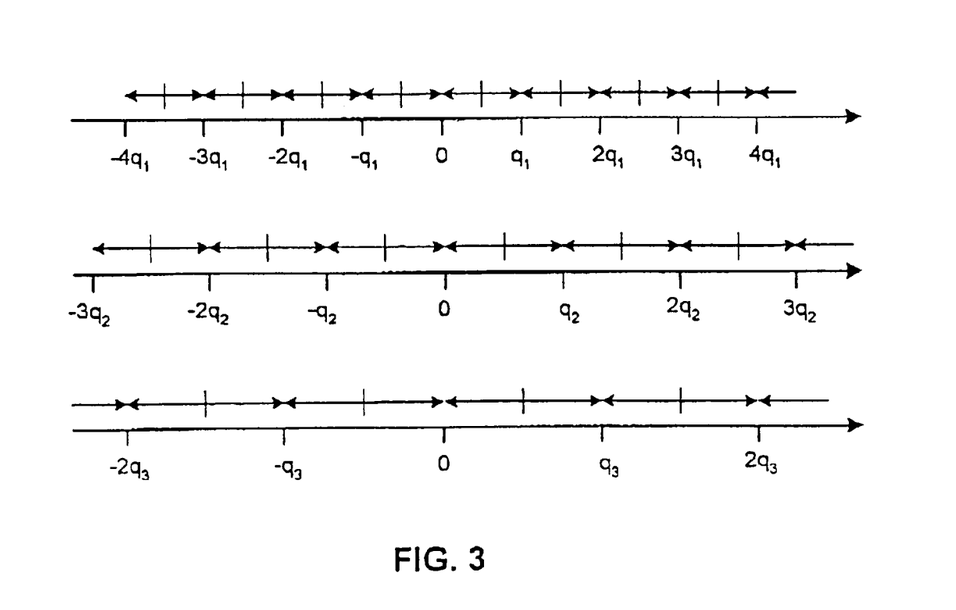
FIG. 3 illustrates a set of uniform quantizers.

In encoding and decoding methods according to the invention, a set of quantizers is defined. Different quantizers may differ in the way reconstruction values and intervals are selected. Quantization of a motion coefficient $a_i$ can be performed e.g. by utilizing following equation:

$$\hat{a}_i = \left\lfloor \frac{a_i + \frac{q}{2}}{q} \right\rfloor \quad (9)$$

where q is a quantization parameter defining the interval between reconstruction points and $\lfloor x \rfloor$ is the 'floor' operation (largest integer not larger than x). In this case, the quantization output $\hat{a}_i$ is an integer index that can be entropy coded and transmitted to a decoder. In this example, the corresponding inverse quantization operation can be defined by $$\tilde{a}_i = q\hat{a}_i \quad (10)$$

and the inverse quantized motion coefficients $\tilde{a}_i$ are used to approximate the original coefficients $a_i$. Equations 9 and 10 define a uniform quantizer with evenly distributed reconstruction values and reconstruction intervals of equal size. FIG. 3 illustrates three uniform quantizers having different values of q: $q_1$, $q_2$ and $q_3$.

Figure 4:
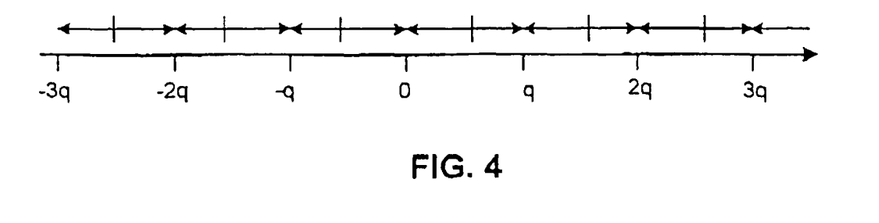
FIG. 4 illustrates a modified uniform quantizer.

FIG. 4 illustrates a modified uniform quantizer. In this quantizer, parameter q defines the reconstruction points. The quantization interval, in which the coefficient $a_i$ values are mapped to $\hat{a}_i=0$, is larger than the other quantization intervals, which are of constant size. This quantizer can be defined, for example, using an additional parameter $\epsilon$, which is half of the increase in the quantization interval for $\hat{a}_i=0$. Quantization according to the modified uniform quantizer can be defined, for example, by $$\hat{a}_i = \left\lfloor \frac{a_i - \text{sgn}(a_i)\varepsilon + \frac{q}{2}}{q} \right\rfloor$$

where $\text{sgn}(a_i)$ gives the sign of $a_i$. The corresponding inverse quantization operation can be defined, for example, using equation 10.

When the modified uniform quantizer is used, the transmission of quantized coefficients $\hat{a}_i$ is likely to require fewer bits. This is because the quantization interval corresponding to values near zero is larger than in the uniform quantizer, and typically a zero-valued quantized coefficient can be transmitted using a smaller number of bits than quantized coefficients having non-zero values.

Above, two different quantizers are described as examples of quantizers that can be used in a method according to the invention. In quantization, the size of the quantization interval is inversely proportional to the number of bits needed to represent the quantized coefficients $\hat{a}_i$. The quantization interval also determines the accuracy according to which the inverse quantized coefficients $\tilde{a}_i$ correspond to the original coefficients $a_i$. The quantization interval thus represents the trade-off between quantization accuracy and the amount of information needed in transmitting motion coefficients to the decoder. In a method according to the invention, a set of quantizers is defined for quantizing the motion coefficients. The set may comprise, for example, various uniform quantizers having different values of q.

Figure 5:
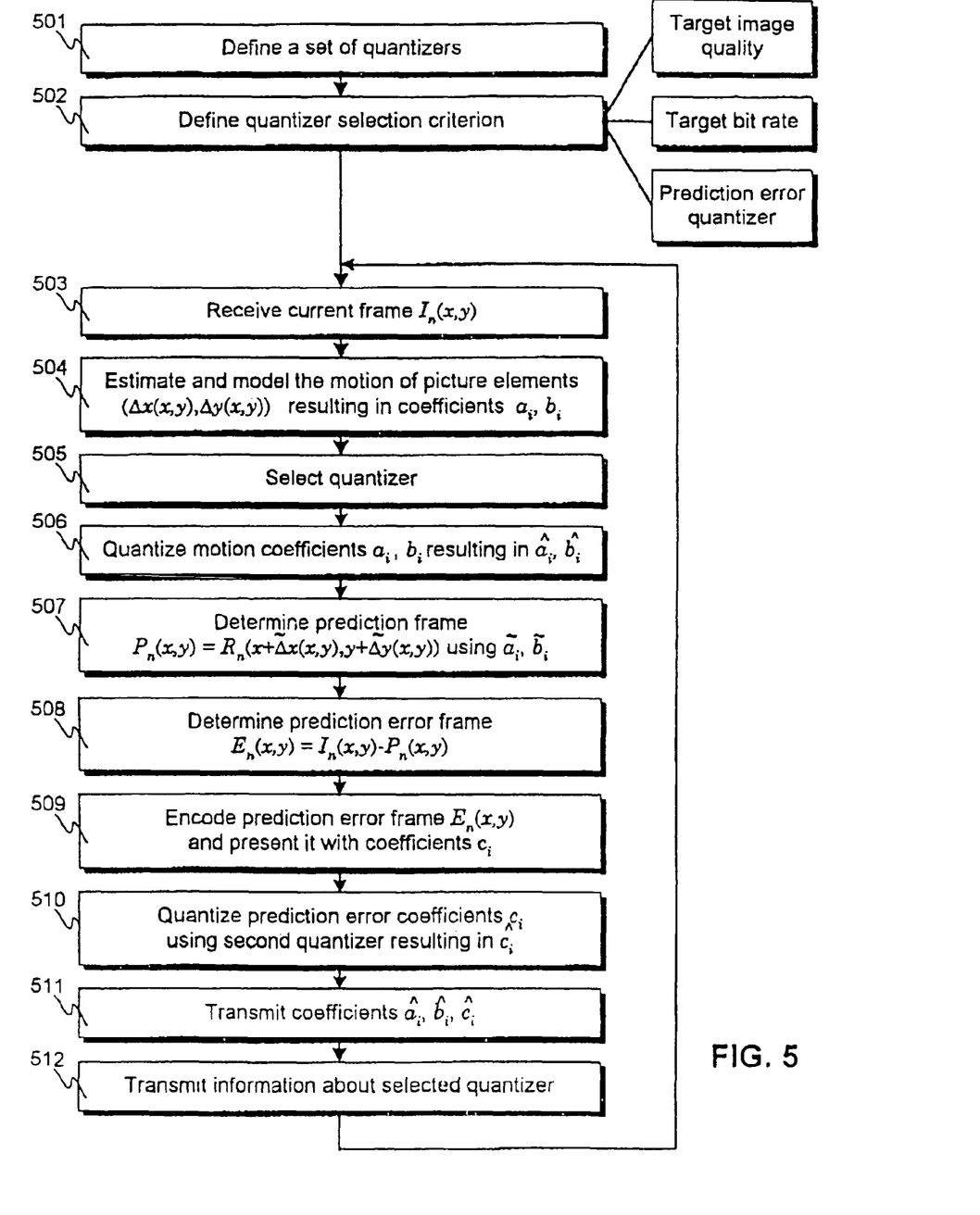
FIG. 5 illustrates a flowchart of a motion compensated video encoding method according to the invention.

FIG. 5 presents a flowchart of a motion compensated video encoding method according to the invention. In step 501, a set of quantizers for quantizing the motion coefficients is defined. The quantizers may be, for example, uniform quantizers having various quantization intervals, that is different values of parameter q. When uniform quantizers are used, it is enough to define the allowed quantization intervals in step 501. In step 502 an appropriate criterion for selecting the quantizer is defined. This criterion can be, for example, the target image quality or the target bit rate. It is also possible to select the motion information quantizer based on a previously selected prediction error quantizer. In step 503 the current frame $I_n(x,y)$ is received. In step 504 motion in the current frame is estimated and modeled, for example, segment by segment using certain basis functions $f_i(x,y)$ and $g_i(x,y)$, and coefficients $a_i$ and $b_i$. The motion vector field is thus represented as $$\Delta x(x, y) = \sum_{i=0}^{N-1} a_i f_i(x, y)$$

$$\Delta y(x, y) = \sum_{i=0}^{M-1} b_i g_i(x, y).$$

Selecting the quantizer according to the invention does not pose any restrictions on the motion field estimation and/or coding methods that can be used. The estimation and coding of the motion vector field can be made, for example, using any techniques used in prior art motion compensated video coding schemes. The basis functions used in coding the motion field vector are most preferably orthogonal, because orthogonal functions are less sensitive to inaccuracies in the decoded motion coefficients caused by quantization. Any basis function, however, may be used. Furthermore, the motion vector field that is coded can be, for example, a refinement motion vector field which is used to correct a prediction motion vector field constructed, for example, by using the motion of neighboring segments within the frame.

When a translational model is used to represent the motion vector field, the estimation of the motion vector field is typically carried out using a certain accuracy. This accuracy is the upper limit (that is, the best possible accuracy) with which the motion coefficients $a_0$ and $b_0$ can be determined. Using quantization according to the invention, it is possible to lower the accuracy with which the motion coefficients are transmitted to a receiver.

In step 505 the quantizer to be used in the quantization of the motion coefficients $a_i$ and $b_i$ is selected and in step 506 the motion coefficient are quantized, resulting in the quantized coefficients $\hat{a}_i$ and $\hat{b}_i$. They are transmitted to a receiver in step 511. Advantageously the receiver determines the motion information quantizer with reference to, for example, the quantizer (QP) used to encode the prediction error information or the target bit rate of the encoded video stream. If the motion coefficient quantizer is chosen with reference to the quantizer QP used to encode the prediction error information, the receiver is able to determine the motion coefficient quantizer implicitly. In this case an explicit indication of the selected value of q, for example, is not required. It is, however, an alternative to transmit information relateing to q in step 512. It can be transmitted as part of the encoded video frame or it can be signaled independently to the receiver. Furthermore, the receiver may determine the selected quantizer, for example, from the format in which the quantized coefficients are transmitted.

In step 507 a prediction frame $P_n(x,y)$ can be determined using a reference frame $R_n(x,y)$ $$P_n(x,y)=R_n(x+\tilde{\Delta}x(x,y),y+\tilde{\Delta}y(x,y)).$$

Inverse quantized coefficients $\tilde{a}_i$ and $\tilde{b}_i$ are typically used in constructing $\tilde{\Delta}x(x,y)=\Sigma\tilde{a}_i f_i(x,y)$ and $\tilde{\Delta}y(x,y)=\Sigma\tilde{b}_i g_i(x,y)$. Thereafter the prediction error frame $E_n(x,y)=I_n(x,y)-P_n(x,y)$ can be determined (step 508), and it can be encoded (step 509). After encoding, the prediction error frame can be represented using prediction error coefficients $c_i$. In step 510 the prediction error coefficients are quantized using a second quantizer. The resulting quantized prediction error coefficients $\hat{c}_i$ are transmitted to the receiver in step 511. The selection of the second quantizer is out of the scope of the present invention. Typically its selection is dictated by the target image quality. It may alternatively be defined according to the requirements of a video coding standard, for example ITU-T Recommendation H.261 or H.263.

Above, frames as used as an example of a piece of video information. In encoding and decoding methods and apparatus according to the invention, it is also possible to transmit and process video information, for example, block-by-block or segment-by-segment in addition to the frame-by-frame approach.

Figure 6:
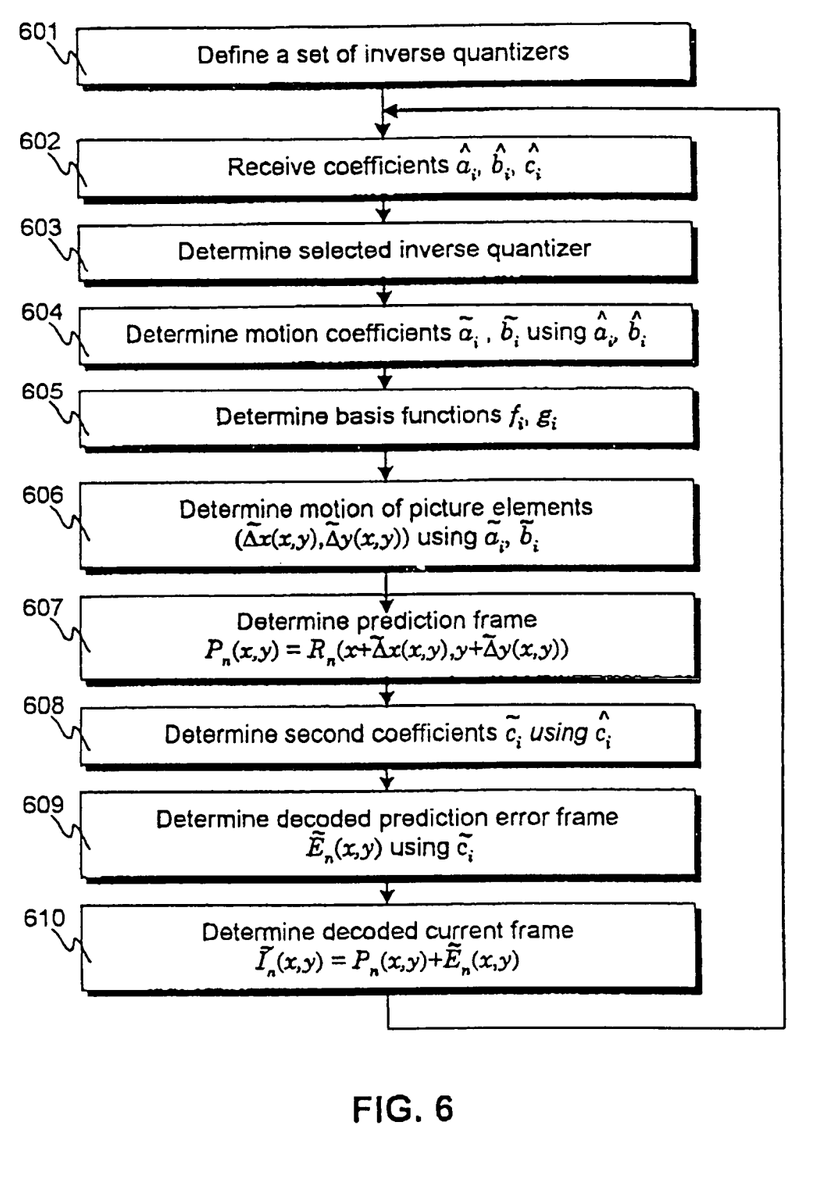
FIG. 6 illustrates a flowchart of a motion compensated video decoding method according to the invention.

FIG. 6 illustrates a flowchart of a decoding method for motion compensated coded video frames according to the invention. In step 601 a set of inverse quantizers is defined, and in step 602 the quantized coefficients $\hat{a}_i$ and $\hat{b}_i$ are received. In step 603 the motion information quantizer is determined. It can be determined, for example, by determining from the received prediction error coding data the prediction error quantizer, and selecting an inverse quantizer for motion coefficients according to a predefined set of rules. Alternatively, the inverse quantizer may be selected according to an explicit indication in the received bit stream. Thereafter inverse quantization of the motion coefficients is carried out (step 604), resulting in the inverse quantized motion coefficients $\tilde{a}_i$ and $\tilde{b}_i$. In step 605, the basis function $f_i(x,y)$ and $g_i(x,y)$ are determined. The basis function may be determined a priori if the motion estimation and coding technique uses only certain basis functions. It is also possible that the motion estimation and coding technique uses motion model adaptation, in which case information about the selected basis functions is transmitted to the receiver. Information about these can be, for example, transmitted within the encoded frame, or the basis functions may be otherwise known to both the encoding and decoding method.

In step 606 the motion of picture elements is determined using at least the inverse quantized motion coefficients and the basis functions. Thereafter the prediction frame $P_n(x,y)$ can be determined in step 607. In step 608 the quantized prediction error coefficients $\hat{c}_i$ are dequantized using an inverse quantizer related to the prediction error. In step 609 a decoded prediction error frame $\tilde{E}_n(x,y)$ is constructed using the inverse quantized prediction error coefficients $\tilde{c}_i$. In step 610 the decoded current frame is determined, for example, by $\tilde{I}_n(x,y)=P_n(x,y)+\tilde{E}_n(x,y)$.

Figure 7:
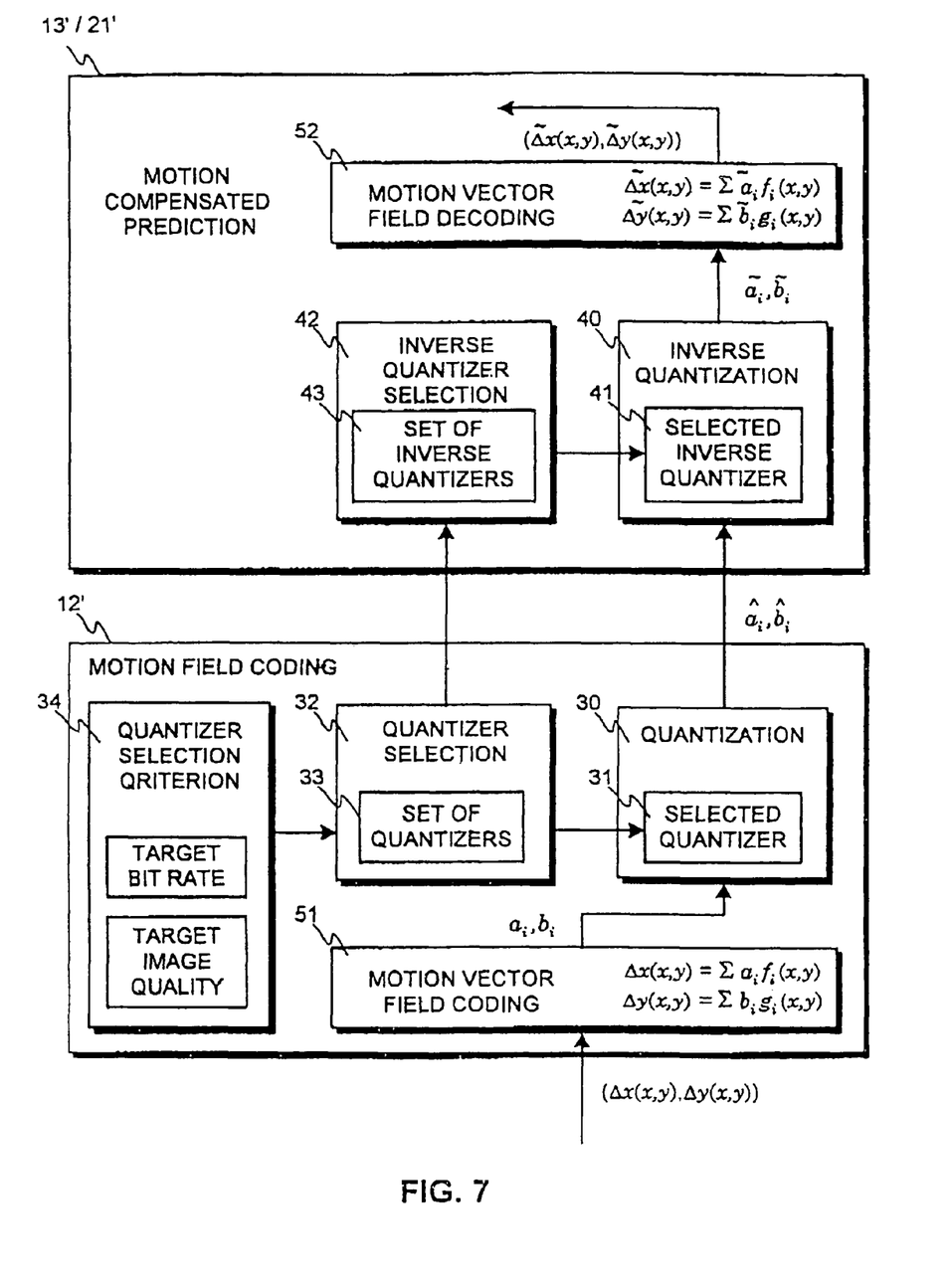
FIG. 7 illustrates the motion field encoding and motion compensated prediction blocks of an encoder according to a first preferred embodiment of the invention.

FIG. 7 presents a schematic drawing of a motion field coding block and a motion compensated prediction block of a motion compensated video encoder according to a first preferred embodiment of the invention. In the motion field coding block 12' motion field coding is carried out using the motion vector field coding block 51. The output of the motion vector field coding block comprises the motion coefficients $a_i$ and $b_i$. The quantization block 30 is responsible for the quantization of the motion coefficients. It performs the quantization using a selected quantizer 31. The quantizer selection block 32 comprises a set of quantizers 33, from which the currently used quantizer is selected. The quantizer selection criterion block 34 outputs the current criterion for the selection. It may, for example, indicate the current target image quality or the target bit rate, and the quantizer selection block 32 selects an appropriate quantizer based on the criterion.

In the motion compensated prediction block 13' according to the invention, there is an Inverse Quantization Selection block 42, comprising a set of inverse quantizers 43. Inverse quantization is carried out in the Inverse Quantization block 40, using the selected inverse quantizer 41. The inverse quantized motion coefficients $\tilde{a}_i$ and $\tilde{b}_i$ are typically further used in the Motion Vector Field Decoding block 52 for determining a prediction frame $P_n(x,y)$.

Information about the quantized motion coefficients is transmitted from the Quantization block 30 to the Inverse Quantization block 40 in the Motion Compensated Prediction block 13'. In FIG. 7, information about the selected quantizer is transmitted from the Quantizer Selection block 32 to the Inverse Quantizer Selection block 42 in the Motion Compensated Prediction block 13' in the encoder.

A decoder according to the invention comprises a Motion Compensated Prediction block 21' which is similar to the Motion Compensated Prediction block 13' in an encoder according to the invention. The Inverse Quantization Selection block 42 in the decoder may receive separate information from which it can determine the correct inverse quantizer from the encoder or, alternatively, it may receive the information from some other part of the decoder.

Figure 8:
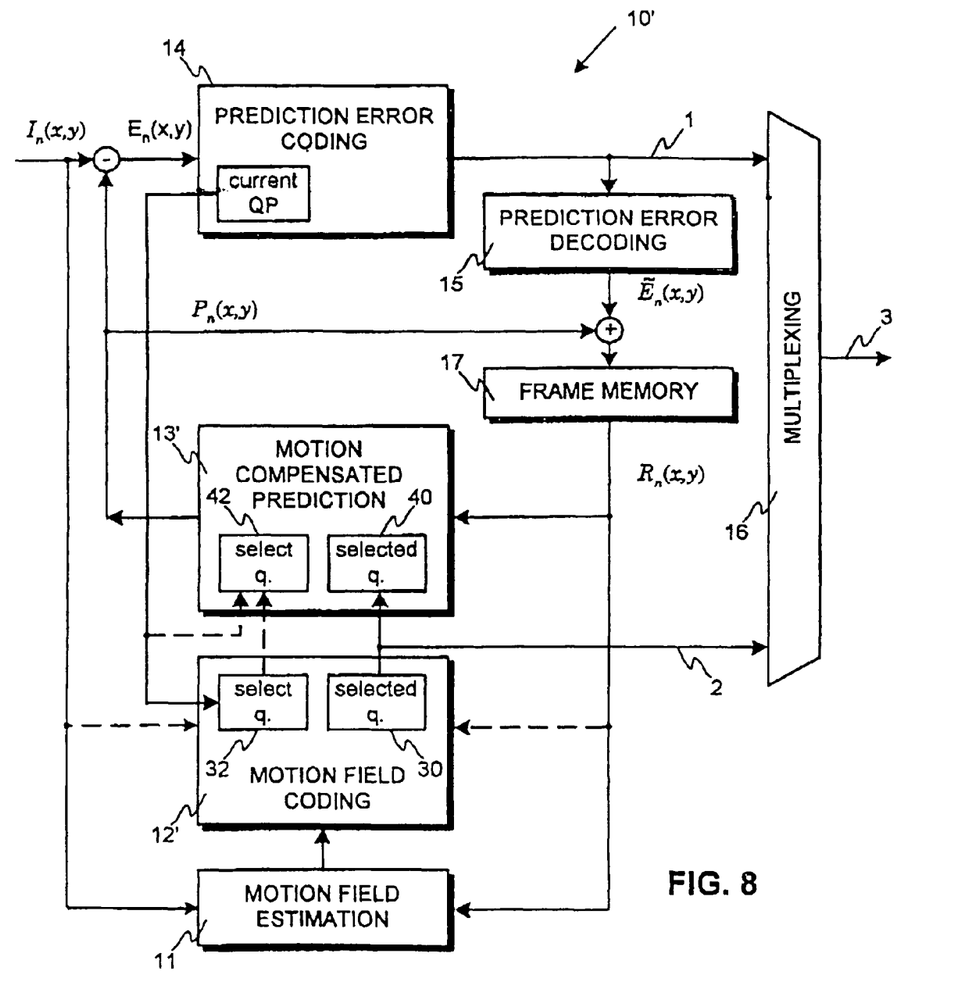
FIG. 8 illustrates an encoder for motion compensated encoding of video according to a second preferred embodiment of the invention.

FIG. 8 presents a schematic diagram of a motion compensated video encoder according to a second preferred embodiment of the invention. In the encoder 10' according to the invention there is Motion Field Coding block 12', which comprises a Quantization block 30 and a Quantizer Selection block 32. The Motion Compensated Prediction block 13' of the encoder 10' comprises an Inverse Quantization block 40 and an Inverse Quantizer Selection block 42. The quantized coefficients (arrow 2) and information about the prediction error (arrow 1) are transmitted to a decoder.

In an encoder according to the second preferred embodiment of the invention, the selection of the motion coefficient quantizer is dictated by the quantizer QP used in the Prediction Error Coding block 14 of the encoder. The prediction error quantizer QP can be selected, for example, based on the target image quality. By binding the selection of the quantizer used in quantizing the motion coefficients to the quantizer used in the coding of the prediction error, the target image quality of the encoded video frames can be reliably attained. The Prediction error Coding block 14 may indicate the current prediction error quantizer (QP) to the Quantizer Selection block 32 and also to the Inverse Quantizer selection block 42 in the encoder 10'. The Quantizer Selection block 32 may alternatively inform the Inverse Quantization Selection block 42 in the encoder 10' about the prediction error quantizer.

The Quantizer Selection block 32 and the Inverse Quantizer Selection block 42 may alternatively reside, for example, in the Prediction Error Coding block 14 of the encoder.

In a decoder according to the second preferred embodiment of the invention, the decoder receives information about the quantizer used in coding the prediction error frame and thus there usually is no need to transmit explicit information concerning the quantizer of the motion coefficients. The decoder may determine the motion coefficient quantizer using the information transmitted from the Prediction Error Coding block 14 (arrow 1) or from corresponding signaling information. The information streams 1 and 2 are typically multiplexed to an information stream 3 representing the encoded video frame. This information stream is transmitted to a decoder according to the invention. The information about the prediction error quantizer may alternatively reside in the decoder and require no communication between the encoder and decoder.

The dashed arrows pointing to the Motion Field Coding block12' in FIG. 8 present some possible examples of information streams within the encoder. The details of the structure of the encoder depend on the particular motion field estimation and coding techniques employed.

Figure 9:
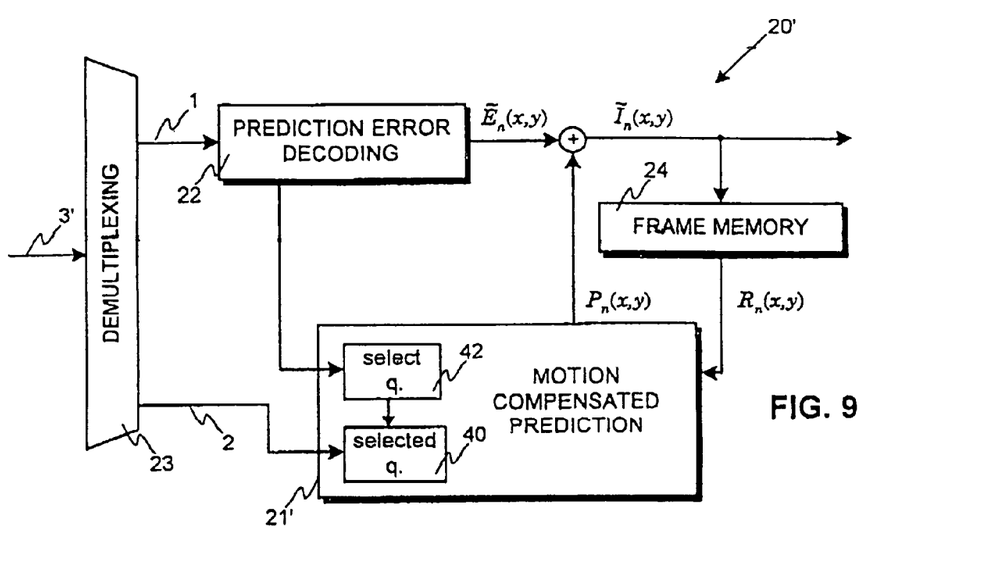
FIG. 9 illustrates a decoder for motion compensated decoding of video according to the second preferred embodiment of the invention.

FIG. 9 presents a schematic diagram of a decoder 20' for decoding motion compensation coded video frames according to the second preferred embodiment of the invention. It comprises a Motion Compensated Prediction block 21', where there is an Inverse quantization block 40 according to the invention and an Inverse Quantizer Selection block 42 according to the invention. Typically the Prediction Error Decoding block 22' informs the Inverse Quantizer Selection block 42 about the selected quantizer QP used to quantize the prediction error information. This Inverse Quantization Selection block 42 then selects an appropriate inverse quantizer for the motion coefficient information on the basis of the QP value it receives from the Prediction Error Decoding block. The Inverse Quantizer Selection block 42 may alternatively reside, for example, within the Prediction Error Decoding block 22 of the decoder.

Figure 10:
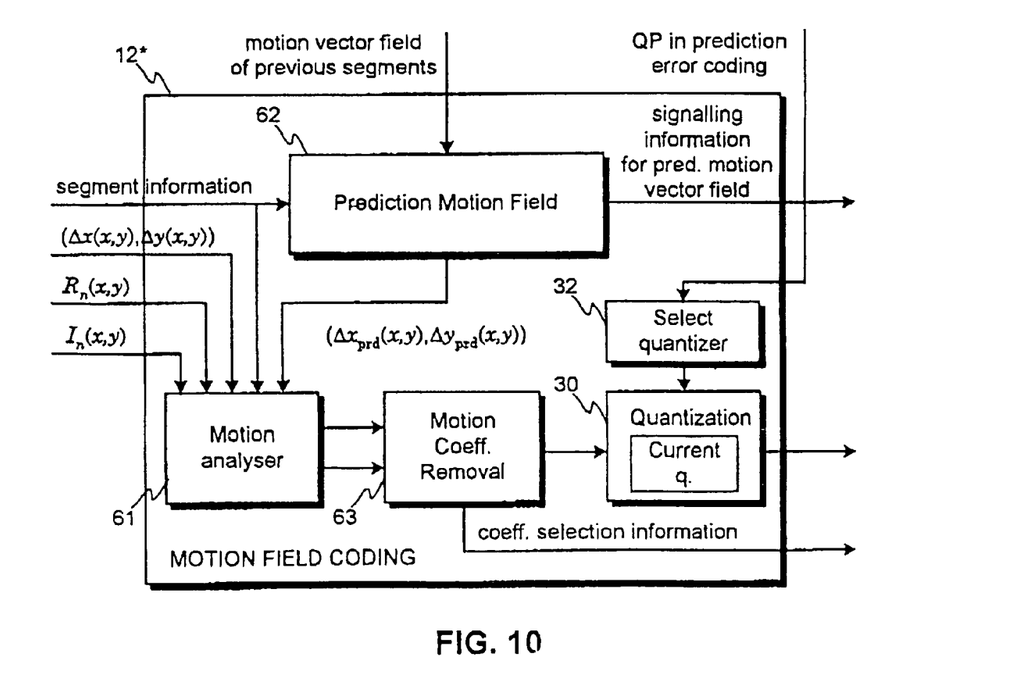
FIG. 10 illustrates a motion field encoding block of an encoder according to a third preferred embodiment of the invention.

FIG. 10 presents a more detailed schematic diagram of a Motion Field Coding block 12* according to a third preferred embodiment of the invention. The main idea in this motion field coding block is to present the motion vector field as a sum of two vector fields: a vector field that can be predicted from other segments in the frame $\Delta x_{prd}(x,y)$ and $\Delta y_{prd}(x,y)$ and a refinement motion vector field $\Delta x_{refinement}(x,y)$ and $\Delta y_{refinement}(x,y)$. We refer to the patent application U.S. Ser. No. 09/371,641 concerning details of the motion vector field estimation and coding in a Motion Field Coding block 12* according to the third preferred embodiment of the invention. Here we only briefly describe the coding of the motion vector field in block 12* at a general level.

In block 12* there is a Motion Analyser block 61 and a block 62, which is responsible for the selection of a neighboring segment and for building the Prediction Motion Field. Typically, when predicting the motion of a certain segment, the motion of at least one of its neighboring segments is used. This prediction is then refined by determining a refinement motion vector field, which is coded, for example, using an affine model employing orthogonal basis functions. The Motion Coefficient Removal block 63 basically determines, which refinement motion coefficients can be set to zero without causing the accuracy of the motion vector field to deteriorate to an unacceptable level. The refinement motion coefficients, remaining after the removal procedure, are quantized in a Quantization block 30 according to the invention.

The selection of the quantizer used to quantize motion coefficients can be dictated by the choice of the quantizer used in the Prediction Error Coding block of the encoder. The Prediction Error Coding can be performed according to the ITU-T Recommendation H.263 using 2-dimensional Discrete Cosine Transform and defining two uniform quantizer QP for the frame: $QP_P$ stays constant over the whole frame and $QP_S$ may vary for each 16×16 pixel segment in the frame.

In the third preferred embodiment of the in invention, the set of quantizers consists of uniform quantizers having different quantization intervals. Therefore, the selected motion coefficient quantizer can be specified by its quantization interval. Thie quantization interval, in turn, is defined by parameter q. This parameter can be dependent, for example, on the quantization parameter $QP_P$. In Table 1, q denotes the quantization interval in the motion coefficient quantization and $QP_P$ denotes half of the quantization interval of the prediction error coefficients. Motion coefficients in block 12* can be quantized according to Table 1, in other words, by selecting the quantizer in block 30 based on the value of $QP_P$. Thereafter the quantized motion coefficients can be entropy coded and transmitted to a decoder.

TABLE 1

Relationship between the quantization interval q related to motion coefficients and quantization interval $QP_P$ related to prediction error coefficients.

| $QP_P$ | q |
|---|---|
| 1 | 2 |
| 2 | 2 |
| 3 | 2 |
| 4 | 2 |
| 5 | 2 |
| 6 | 3 |
| 7 | 3 |
| 8 | 3 |
| 9 | 3 |
| 10 | 3 |
| 11 | 3 |
| 12 | 3 |
| 13 | 4 |
| 14 | 4 |
| 15 | 4 |
| 16 | 4 |
| 17 | 4 |
| 18 | 4 |
| 19 | 4 |
| 20 | 5 |
| 21 | 5 |
| 22 | 5 |
| 23 | 5 |
| 24 | 5 |
| 25 | 6 |
| 26 | 6 |
| 27 | 6 |
| 28 | 7 |
| 29 | 7 |
| 30 | 8 |
| 31 | 8 |

As can be seen from Table 1, the size of the quantization interval used to quantize the motion coefficients is related to the quantization interval used in the quantization of the prediction error coefficients. This means that when the prediction error is transmitted using a higher accuracy, the motion information is automatically transmitted using a higher accuracy and vice versa. The value of $QP_P$ can be selected, for example, based on the target image quality. Once the value of $QP_P$ is known, it is possible straightforwardly to determine a quantizer and an inverse quantizer corresponding to said $QP_P$ value.

It is also possible to have a set of quantizers which comprises uniform and non-uniform quantizers. In this case, it is also possible to select a quantizer depending on the value of $QP_P$.

An encoder or a decoder according to the invention can be realised using hardware or software, or using a suitable combination of both. An encoder or decoder implemented in software may be, for example, a separate program or a software building block that can be used by various programs. The Quantization block, Quantizer Selection block and Quantizer Selection Criterion block are in the above description and in the drawings represented as separate units, but the functionality of these blocks can be implemented, for example, in one software program unit responsible for the selection of a quantizer and quantization of the motion coefficients.

It is also possible to implement an encoder according to the invention and a decoder according to the invention in one functional unit. Such a unit is called a codec. A codec according to the invention may be a computer program or a computer program element, or it may impletemented at least partly using hardware.

In view of the foregoing description it will be evident to a person skilled in the art that various modifications may be made within the scope of the invention. While a number of preferred embodiments of the invention have been described in detail, it should be apparent that many modifications and variations thereto are possible, all of which fall within the true spirit and scope of the invention.

We claim:

1. A method for decoding encoded video information, the method comprising:
   determining, via a decoder, a prediction error quantizer from encoded video information, the prediction error quantizer used to quantize prediction error transform coefficients; and wherein the decoder further provides the functions of:
   determining an accuracy of motion coefficients based on the prediction error quantizer, the motion coefficients representing the motion of a picture segment; and
   decoding encoded video information into an image based on the prediction error quantizer and the accuracy of the motion coefficients.

2. The method for decoding encoded video information according to claim 1, further comprising:
   receiving information indicating a motion coefficient quantizer for determining the accuracy of the motion coefficients.

3. A method according to claim 1 wherein, in the determining of the accuracy of the motion coefficients, there is a communication of information of the prediction error quantizer from the encoded video information for use in the determining of the accuracy of the motion coefficients.

4. A decoder for decoding encoded video information, the decoder comprising:
   a demultiplexing unit for determining a prediction error quantizer from the encoded video information, the prediction error quantizer used to quantize the prediction error transform coefficients; and
   a motion field coding block for determining an accuracy of the motion coefficients based on the prediction error quantizer, the motion coefficients representing the motion of a picture segment.

5. The decoder for decoding encoded video information according to claim 4, wherein the demultiplexing unit is further configured to:
   determine signalling information indicating a motion coefficient quantizer for selecting the accuracy of the motion coefficients from the encoded video information.

6. A non-transitory computer-readable storage medium containing a computer program which, upon execution by a computer, directs the computer to perform the method of:
   decoding encoded video information;
   determining a prediction error quantizer from the encoded video information, the prediction error quantizer used to quantize the prediction error transform coefficients; and
   determining an accuracy of the motion coefficients based on the prediction error quantizer, the motion coefficients representing the motion of a picture segment.

7. The non-transitory computer-readable storage medium containing a computer program which, upon execution by a computer, directs the computer to perform the method according to claim 6, wherein the method further comprises:
   receiving information indicating a motion coefficient quantizer for determining the accuracy of the motion coefficients.

8. An apparatus comprising a decoder for decoding encoded video information, wherein the decoder comprises:

an inverse quantization unit for determining a prediction error quantizer from motion coefficients of the encoded video information, the prediction error quantizer serving to quantize prediction error transform coefficients; and a further quantization unit for determining an accuracy of the motion coefficients based on the prediction error quantizer, the motion coefficients representing the motion of a picture segment.

9. An apparatus according to claim 8 further comprising a connection from the decoder to the further quantization unit for communication of information of the prediction error quantizer from the encoded video information for use in the determining of the accuracy of the motion coefficients.

* * * * *